Patented June 25, 1946

2,402,677

UNITED STATES PATENT OFFICE 2,402,677

VACUUM DEHYDRATION OF GREEN BEANS

Robert M. Schaffner, Chicago, Ill., assignor to The Guardite Corporation, a corporation of Illinios No Drawing. Application June 19, 1944, Serial No. 541,124

4 Claims. (Cl. 99—204)

This invention relates to the vacuum dehydration of green beans.

Green beans are one of the most difficult materials to dry because they lose their color and flavor rapidly and easily. The usual methods of drying green beans destroy both flavor and color.

In the preferred process the green beans are washed as soon after picking as possible and cut into pieces from 1 to 2 inches long which are loaded on screen bottomed drying trays. Preferably the beans are loaded at densities of 1.0 to 1.5 lbs. per square foot of tray surface. They are then placed in a vacuum blancher while maintained in a buggy holding 6 vertical tiers of trays with 8 trays side by side in each tier. The chamber is evacuated to remove substantially all air, for example, by reducing the pressure to about ½ inch absolute. Saturated steam is then introduced to raise the temperature to the blanching temperature. This is suitably from 190° to 220° F., corresponding to 19 inches absolute pressure to 2 lbs. per square inch gauge pressure. At a tray loading of 1.25 lbs. per square foot, 15 minutes of blanching at a temperature of 190° F. is satisfactory. The chamber is then again evacuated to reduce the pressure and temperature. Suitably the evacuation is carried on at about ½ inch absolute which cools the beans to about 60° F. They are then introduced to a vacuum dryer wherein they are dried at low pressure, for example, 2¼ inches absolute, in an atmosphere of superheated steam while subjected on all sides to intense radiant energy. This is suitably supplied by surrounding steam coils arranged in consecutive banks maintained at varying temperatures. Each tier of trays is surrounded by steam coils above and below the trays. Suitably the heating coils are 2¼ inches external diameter pipes, ¼ inch apart in horizontal rows, the nearest point on the pipe being approximately 3 inches from the bottom of the trays. A suitable apparatus for carrying out the blanching and drying is illustrated in Heineman application 520,773, filed February 2, 1944, and Baer application 524,177, filed February 28, 1944. The beans are dehydrated to a moisture content below 10% and preferably below 7% as compared with an initial moisture content of around 91%. The radiant heat surfaces may be maintained at temperatures of 316° F. to 200° F., the higher temperature being at the beginning of the process and the lower temperature at the end. A satisfactory cycle is the use of 316° F. for 30 minutes, followed by 259° F. for 30 minutes, and by 228° F. for 150 minutes.

The products retain their color and flavor without the use of sulfur dioxide.

The following table shows operating results on a number of tests of green bean dehydration:

[Operating vacuum pressure 57 mm.]

|  | 1 | 2 | 3 | 4 | 5 | 6 |
|---|---|---|---|---|---|---|
| Variety | Giant stringless | (Burpee stringless green pod). | | | | |
| Processed, hrs. after harvesting | 5 | 19 | 69 | 63 | 69 | 87. |
| Original moisture_____percent | 90.3 | 90.8 | | 91.0 | 91.0 | 91.0. |
| Final moisture_____do | 6.5 | 5.0 | 5.6 | 3.2 | 3.6 | 5.9. |
| Color | 2nd best | Good | Good | Good | 3rd best | Best. |
| Flavor | Good | do | do | do | Good | SO₂ taste. |
| Texture | Best | Fair | Fair | Fair | do | Good. |
| Dehydration ratio | 10.0 | 10.2 | 9.57 | 9.78 | 9.60 | 8.80. |
| Rehydration ratio | 5.10 | 4.81 | 5.11 | 5.12 | 4.85 | 4.76. |
| Reconstitution_____percent | 51.0 | 47.2 | 53.5 | 52.3 | 50.5 | 54.1. |
| Pretreat. (other than washing and cutting) | None | None | None | None | None | SO₂ gas. 10 min. 4½" vac. |
| Loading_____lbs. sq. ft | 1.06 | 1.13 | 1.05 | 1.23 | 1.25 | |
| Machine blanch: | | | | | | |
| Temp_____°F | 202 | 199 | 203 | 198 | 190 | 198. |
| Time_____min | 15 | 15 | 15 | 15 | 15 | 15. |
| Drying cycle: | P   M | P   M | P   M | P   M | P   M | P   M |
| P—steam coil pres., pounds/sq. inch | 70  30<br>20  10<br>5  150 | 50  30<br>20  10<br>5  140 | 60  30<br>20  20<br>5  110 | 30  30<br>10  30<br>5  210 | 40  30<br>10  30<br>5  210 | 50  30<br>20  10<br>5  130 |
| M—minutes | | | | | | |
| Total time | 190 | 180 | 160 | 270 | 270 | 170 |

The term "dehydration ratio" employed in the table is the raw weight divided by the dehydrated weight. The rehydration ratio is the rehydrated weight divided by the dehydrated weight. The rehydrated weight was obtained after 30 minutes of boiling of the dried beans without previous soaking. The reconstitution per cent is the rehydration ratio divided by the dehydration ratio. The steam coil pressure given in the drying cycle is the internal pressure maintained in the heating coils.

The beans may be blanched by the usual hot water and steam methods but will not retain the color and flavor in the same manner accomplished by the preferred process. It is of course preferred to transfer the beans directly from the vacuum blancher to the vacuum dryer without contacting them with the atmosphere. It will be noted, however, that the pressure in the vacuum blancher is reduced below that in the vacuum dryer before the beans are introduced. This may cause a slight condensation of surface moisture on the beans just before subjection to the most intense radiant heat.

In the drying apparatus superheated steam is introduced to the drying chamber at the beginning and end thereof and is withdrawn from the middle.

The foregoing detailed description has been given for clearness of understanding only, and no unnecessary limitations should be understood therefrom.

What I claim as new, and desire to secure by Letters Patent is:

1. The method of drying green beans which comprises loading on screens at densities of 1.0 to 1.5 lbs. per square foot, blanching the beans in saturated steam and then drying them in an atmosphere of superheated steam at sub-atmospheric pressure while subjected to intense radiant energy on all sides, the temperature of the radiant energy being from 316° F. at the beginning of the drying to 200° F. at the end thereof for a source of radiant energy approximately 3 inches from the beans, said beans being blanched and dried in substantial absence of air without intermediate contact with air.

2. The method of drying green beans which comprises loading the beans on screens at 1.0 to 1.5 lbs. per square foot of screen area, removing air from the beans and substituting an atmosphere of saturated steam, increasing the pressure of the steam to raise the temperature of the beans to from 190 to 220° F., maintaining the beans at that temperature range for a time sufficient to blanch them, reducing the pressure to cool the beans to a temperature of approximately 60° F. at a pressure of ½ inch of mercury absolute, and then drying the beans in an atmosphere of superheated steam at greater absolute pressure but still sub-atmospheric while subjected to intense radiant energy.

3. The method as set forth in claim 2, in which the radiant energy is maintained at a temperature of from 316° F. at the beginning of the drying cycle to 200° F. at the end thereof, for a distance of approximately 3 inches from the source of radiant energy.

4. The method as set forth in claim 2, in which the drying is accomplished by subjection to radiant energy of approximately 316° F. for 30 minutes, approximately 259° F. for 30 minutes, and then 228° F. for 150 minutes, the temperatures being for a radiant energy source approximately 3 inches from the product.

ROBERT M. SCHAFFNER.